(12) United States Patent
Cohen

(10) Patent No.: US 12,552,582 B1
(45) Date of Patent: Feb. 17, 2026

(54) BOTTLES

(71) Applicant: Morris E. Cohen, Brooklyn, NY (US)

(72) Inventor: Morris E. Cohen, Brooklyn, NY (US)

(73) Assignee: Morris E. Cohen, Brooklyn, NY (US)

( * ) Notice: Subject to any disclaimer, the term of this patent is extended or adjusted under 35 U.S.C. 154(b) by 11 days.

(21) Appl. No.: 18/507,111

(22) Filed: Nov. 13, 2023

Related U.S. Application Data

(60) Provisional application No. 63/424,937, filed on Nov. 13, 2022.

(51) Int. Cl.
| | |
|---|---|
| B65D 41/02 | (2006.01) |
| B65D 1/02 | (2006.01) |
| B65D 39/00 | (2006.01) |
| B65D 43/16 | (2006.01) |
| B65D 43/24 | (2006.01) |
| B65D 55/00 | (2006.01) |

(52) U.S. Cl.
CPC ............... *B65D 41/02* (2013.01); *B65D 1/02* (2013.01); *B65D 39/0011* (2013.01); *B65D 43/16* (2013.01); *B65D 43/24* (2013.01); *B65D 55/00* (2013.01); *B65D 2251/1008* (2013.01); *B65D 2543/00092* (2013.01)

(58) Field of Classification Search
CPC ...... B65D 1/0269; B65D 39/00; B65D 55/16; B65D 41/02; B65D 1/02; B65D 39/0011; B65D 43/16; B65D 43/24; B65D 55/00; B65D 2251/1008; B65D 2543/00092
See application file for complete search history.

(56) References Cited

U.S. PATENT DOCUMENTS

| | | | | |
|---|---|---|---|---|
| 3,851,783 | A * | 12/1974 | Braginetz | B65D 39/00 156/64 |
| 4,213,546 | A * | 7/1980 | Massey | B65D 55/16 222/326 |
| 2001/0032867 | A1* | 10/2001 | Silbert | F25D 3/08 215/12.2 |
| 2015/0284153 | A1* | 10/2015 | Cornell | B65D 39/0082 220/283 |
| 2015/0306755 | A1* | 10/2015 | Hinds | B67D 7/50 7/151 |
| 2017/0320647 | A1* | 11/2017 | Van Rixel | B65D 50/00 |
| 2022/0281652 | A1* | 9/2022 | Lutz | B65D 39/0076 |
| 2022/0363439 | A1* | 11/2022 | Torres | B65D 23/12 |

* cited by examiner

*Primary Examiner* — Shawn M Braden
(74) *Attorney, Agent, or Firm* — Goldberg Cohen LLP

(57) ABSTRACT

Bottles include closures, such as corks, having a ring which seals against the inside surface of the bottle, allowing for the bottle to be opened, closed, and reopened. An annular channel in the closure seals against the outside bottle surface. A vertical channel in the closure fits on the rim of the bottle, allowing for the bottle closure to be secured and stored on the bottle while the bottle is open.

10 Claims, 4 Drawing Sheets

BOTTLES

RELATED APPLICATIONS

This application claims the priority of U.S. Provisional Application Ser. No. 63/424,937 filed Nov. 13, 2022, which is fully incorporated herein by reference.

FIELD OF THE INVENTION

This application relates to closures for containers, especially beverage bottles.

BACKGROUND OF THE INVENTIONS

Containers, including, but not limited to, bottles, are well-known in the art. Bottles, for example, are containers made of a material such as glass, plastic, or aluminum, in any of many shapes and sizes, that are used to store and transport liquids. They can be used to hold beverages, including, but not limited to, coffee, tea, milk, juices, carbonated and non-carbonated soft drinks, alcoholic beverages (such as wine, beer, and other liquors and liqueurs). They can also be used to hold a wide variety of other liquids, gels, and pastes, whether food and cooking products (such as oils, condiments, and so forth), hygienic and bath and body products (for application to the exterior or interior of the body, including, but not limited to, cosmetics, moisturizers, toothpaste, and so forth), cosmetics, lubricants and energy sources (including but not limited to, motor oil, gasoline, and so forth), cleaners (such as acetone, naphtha, soaps, detergents, and so forth), health care products (such as anti-microbial products), paints, inks, solutions for medical and scientific research and treatment (including, but not limited to, pharmaceuticals, intravenous solutions, and so forth).

Yet, although many containers and bottles have been designed and commercialized to date, there remains a need for improved bottle designs.

SUMMARY OF THE INVENTIONS

In accordance with the inventions, various container closures is provided.

In a preferred embodiment, the container closures are bottle caps.

In a further preferred embodiment, the bottle caps can be opened and resealed.

In further preferred embodiments, the bottle caps are permanently affixed to the bottle, i.e., non-removable. In these embodiments, the caps can be opened and resealed, but remain part of the bottle. These embodiments, for example, prevent the litter which is seen from separable bottle caps.

Further aspects of the invention will become apparent from the detailed disclosure herein.

DETAILED DESCRIPTION OF THE INVENTIONS AND THE PREFERRED EMBODIMENTS

In preferred embodiments of the invention, a container closure or bottle cap 10 is provided, as shown in the figures and discussed herein. Although the inventions are discussed in connection with bottles as a preferred embodiment, they can be used with any type of desired container.

In various preferred embodiments, the cap is used for beverage containers. For example, the bottle cap can be used for bottles containing water, soft drinks, milk, alcoholic beverages, or any other type of drinks. However, consistent with the invention, the bottle cap can be used for bottles containing and/or dispensing any other types of materials desired. For example, it can be used to dispense food products (such as condiments, honey, and so forth), hair products (e.g., shampoos, conditioners), skin products (moisturizers, etc.), hand sanitizers, and so forth. Additionally, the top can be used for bottles containing solid products.

Preferably, bottle cap 10 is made of a plastic material. Additionally or alternatively, other materials can be used, whether rubber, cork, or so forth. Although the preferred embodiments of the invention are discussed herein with respect to a plastic closure, the description is merely meant to be illustrative, not limiting. Likewise, for each of the features and components of the invention, the description is meant an as illustration of various preferred embodiments, but is not meant as a limitation on the scope of the invention, as it will be understood that the various features described herein can be varied by those of skill in the art.

Preferably, the bottle cap is integrally molded with the top of the bottle. In an alternative embodiment, the bottle cap can be a separate component which is permanently affixed to the top of the bottle. In an alternative embodiment, the bottle cap can be secured and removed (e.g., as a screw top). Although the latter embodiment is not preferred because a fully removable bottle cap can cause litter, is fully consistent with, and within the scope of, the inventions herein.

Bottle cap 10 includes a tab or pull tab 12. Tab 12 can be of any desired shape, whether square, rectangular, circular, oval, or so forth. Preferably, tab 12 has a cutout 14 within it to save on the amount of material needed to manufacture the tab.

Figure 1:
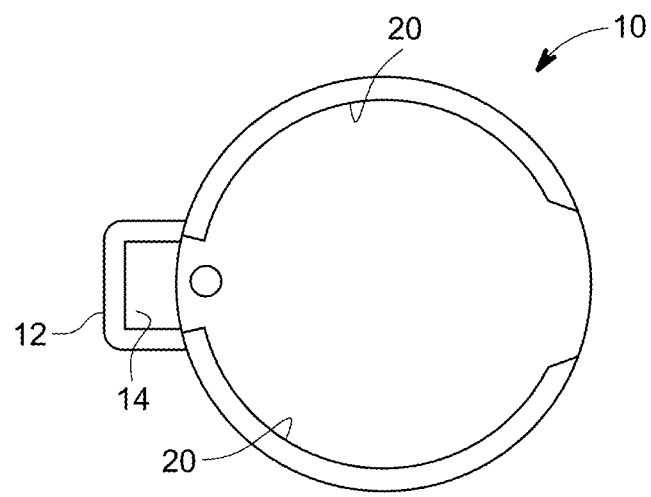
FIG. 1 is a top view of an embodiment of a container closure in the closed position, in accordance with a preferred embodiment of the inventions.
Figure 2:
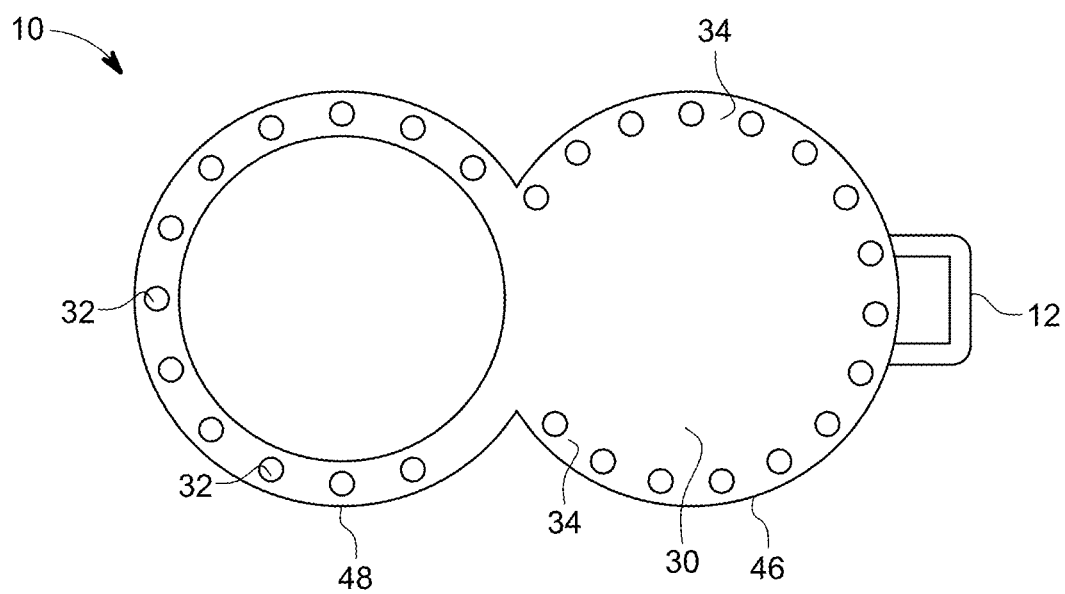
FIG. 2 is a top view of an embodiment of a container closure in the open position, in accordance with a preferred embodiment of the inventions.
Figure 3:
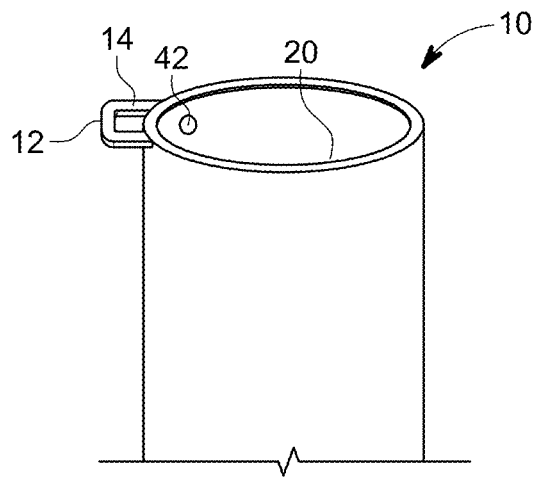
FIG. 3 is a side view of an embodiment of a container closure in the closed position, in accordance with a preferred embodiment of the inventions.

Tab 12 serves as a handle to open and seal the bottle cap. To open the cap, tab 12 is grasped with the fingers, with tab 12 providing leverage to rip the plastic of the bottle closure along tear lines 20. As known in various arts, tear lines 20 are lines along which a material is relatively weakened (here the material of the cap), to allow the user to tear the material along those lines. Although tear lines 20 are shown in FIG. 1 as being placed along an inner circumference of the bottle top, the tear lines 20 can alternatively be the outermost circumference of the bottle cap when viewed from the top. Alternatively, the tear lines can be any other circumference (e.g. along the sides of the cap, or so forth).

Ripping the plastic along the tear lines 20 opens the top of the bottle, making its contents accessible to the user. For example, a user can grasp the tab 12 with several fingers or push it with the thumb, pressing or pulling upwards to rip open the plastic along tear lines 20, to then access the bottles contents (e.g. to drink from a water bottle, or a soft drink).

Preferably, bottle cap 10 also includes mating structures 32 and 34. Mating structures 32 and 34 snugly fit together when pressed against each other. Further preferably, mating structures 32 and 34 are placed along the rim 46 of movable component 30 and rim 48 of the bottle. As many mating structures 32 and 34 as desired can be placed around as much of the rim 48 of the top of the bottle as desired (or any other part of the cap and/or bottle). For example, if the bottle's front is defined as the side with tab 12 facing the user, the mating structures can be placed in any combination of the front, right side, left side, and/or rear of the bottle cap and/or bottle, including any combination of the front, right side, left side, and/or rear of rims 46 and 48.

In one preferred embodiment, structures 32 and 34 comprise protrusions and indentations, such as well known in LEGO® brand building blocks. The protrusions can be placed on the bottom surface of the movable top component 30 of the cap with the indentations being provided on the fixed rim 48 of the bottle. Or, the protrusions can be on the fixed rim 48 of the bottle with the indentations on the bottom surface of the movable top component 30.

The mating structures can be of any size, shape, or configuration desired, so long as they mate together. For example, a series of circular protrusions can be provided which mate with a series of circular indentations. The protrusions can be cylindrical, frustoconical, or so forth. Alternatively or additionally, a series of circular protrusions can be provided which fit into one or more grooves or channels (such as arced grooves or channels). Alternatively or additionally, a rail or series of rails can be provided which fit into one or more grooves or channels. In one version of this latter embodiment, the rails can fit into the grooves such as known with Ziplock® and/or Tupperware® brand storage bags and containers.

Figure 6:
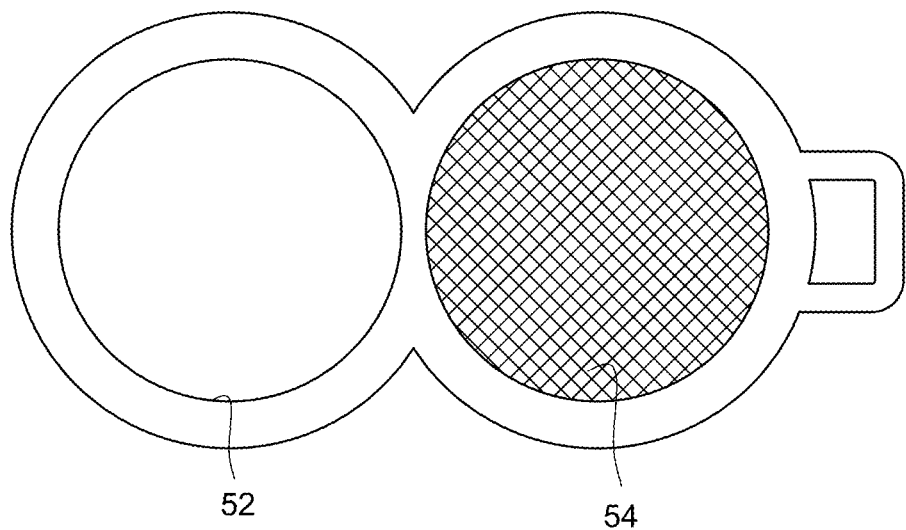
FIG. 6 is a bottom view of a portion of the container closure, in accordance with an alternative or additional embodiment of the invention.
Figure 7:
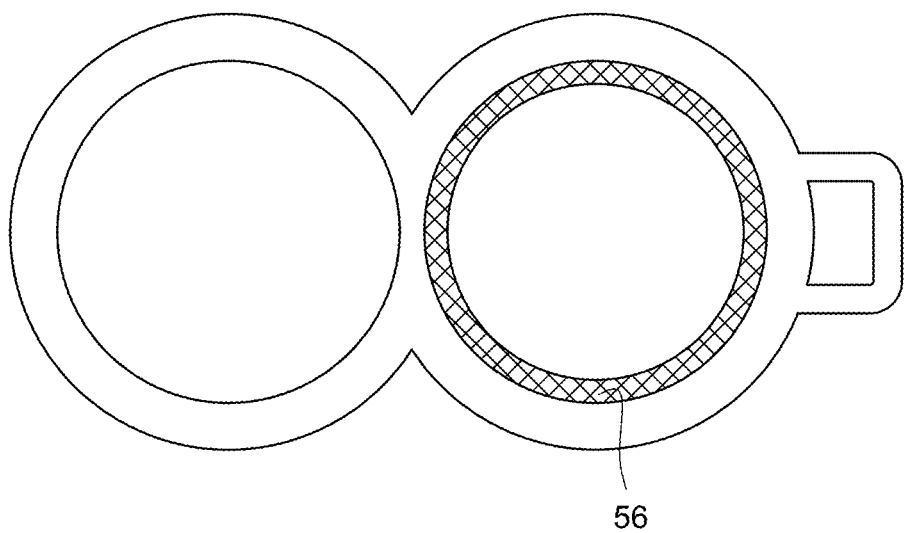
FIG. 7 is a bottom view of a portion of the container closure, in accordance with an further alternative or additional embodiment of the invention.
Figure 8:
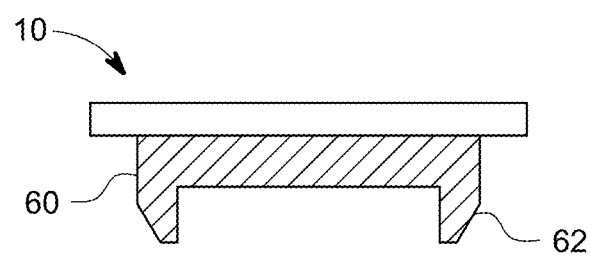
FIG. 8 is a cross-sectional view of a portion of the container closure, in accordance with an further alternative or additional embodiment of the invention in FIG. 7.

Yet further alternatively or additionally, the bottom of the bottle cap mates snugly with the inside circumference 52 of the bottle opening as shown in FIGS. 6-8. A protrusion from the bottle cap downward can fit within that inner circumference of the bottle opening, or a protrusion from the bottle upward can fit within the bottom of the bottle cap (such as a channel in the bottle cap). As examples of the former, the bottom of the bottle cap can have a material (including, but not limited to a piece of plastic or cork) which protrudes downward from the bottle cap and fits snugly into the bottle opening. The embodiments with a cork are particularly useful in contexts such as wine bottles, where cork is popular because its structure creates a watertight seal but also lets small amounts of air move in and out, allowing the wine to develop over time. However, they can also be used (whether with cork or other material) to provide a tighter seal. A tighter seal can be desirable in contexts where one wishes to reduce the loss of carbonation (prevent or slow a beverage from going flat), or wishes to reduce the rate of oxidation of material within the bottle, or so forth.

In these embodiments, as shown in FIG. 6, a piece of cork 54 (or other material) protrudes from the inside bottom of the bottle cap, and fits snugly within the inner circumference 52 of the bottle, to provide a tight seal. Cork 54 can be cylindrical or frustoconical or any other suitable shape.

Additionally or alternatively, as shown in FIG. 7, a ring of cork 54 (or of other material) protrudes from the inside bottom of the bottle cap. This ring likewise fits snugly within the inner circumference 52. FIG. 7 is an additional or alternative embodiment to FIG. 6 in the sense that, in one embodiment of FIG. 7, a ring is provided which protrudes from directly from the bottle cap. In an alternative embodiment of FIG. 7 (as shown in FIG. 8), the bottle cap has a cork 60 (or other material), which is affixed across the bottom of the bottle cap as in FIG. 6, but also has a ring protruding as in FIG. 7. In other words, the cork is partially hollowed out. The embodiments of FIGS. 7 and/or 8 with a ring, can make it easier to pull the cork out of the bottle, and easier to resecure the cork back within the bottle. In accordance with any of the embodiments of FIGS. 6-8, the cork (or other material) can have an angled or tapered surface 62 to further assist in sliding the cork out of, and back into, the inner circumference 52 of the bottle opening.

Alternatively or additionally to the foregoing, any other shaped or sized mating structures can be provided for the container closure.

To close the bottle cap, a user presses the movable top 30 against rim 48. In this manner, the mating structures are pressed together to snugly seal the top of the bottle. The user can then reopen the bottle cap by pulling or pressing against tab 12 to pull the mating structures apart. The user can then repeat the process of opening and closing the bottle cap as often as desired.

Further preferably, the bottle top includes a second set of mating structures 42 and 44 on the outside of the bottle. These structures can likewise be of any size, shape, or mating configuration desired.

Figure 4:
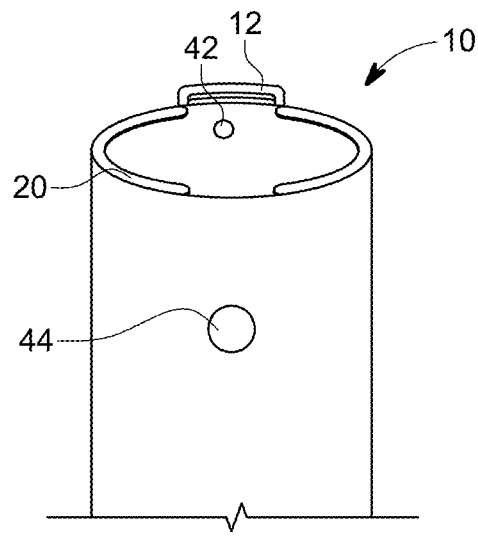
FIG. 4 is a back view of an embodiment of a container closure in the closed position, in accordance with a preferred embodiment of the inventions.
Figure 5:
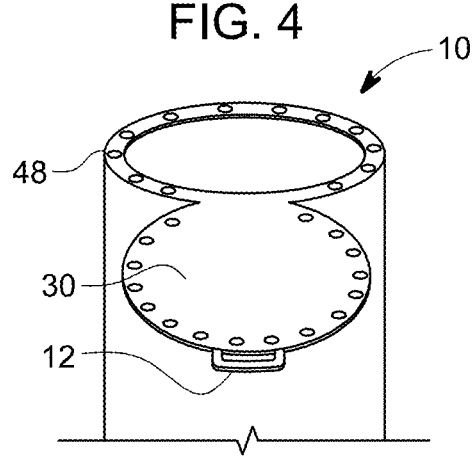
FIG. 5 is a back view of an embodiment of a container closure in the open position, in accordance with a preferred embodiment of the inventions.

Preferably, a mating structure 42 can be placed on the outside top of the movable component 30 of the cap, and a corresponding mating structure 44 can be placed on the outside of the cap and/or bottle. For example, a protrusion 42 can be placed on movable top 30, and an indentation 44 can be placed on the outside of the bottle (or vice versa, an indentation on top 30 and protrusion on the bottle's side). Although mating structures 42 and 44 are shown as circular in FIG. 4, as noted any shape or configuration can be used. Likewise, while mating structure 42 is shown on the top surface of portion 30, it can alternatively be on tab 12, if desired.

In use, when the bottle cap is opened, movable component 30 of the bottle cap is folded back to secure mating structures 42 and 44 together. This secures the movable component 30 to the cap and/or bottle. It can be used, for example, to keep movable component 30 out of the way of the user's mouth when the user is drinking.

In further preferred embodiments, as shown in FIGS. 6-8, the cork mates with the inner circumference of the bottle, such that pulling up on the tab can be used to pull the cork out of the bottle. Likewise, pulling down on the tab and/or pushing down on the rim of the cap can be used to push the cork back into the bottle. Alternatively or additionally, the cork can mate with the outer circumference of the bottle opening (when the ring is increased to greater than the outer circumference of the bottle opening). Further alternatively or additionally, the cork can mate with both the inner circumference and outer circumference of the bottle opening (such as when the cork has two concentric rings, forming a channel for the bottle's rim).

Yet further alternatively or additionally, the cork structure can be provided with or without any of the further features described. For example, a hollowed cork with a ring-shaped bottom can be provided by itself, without being affixed to the bottom of a bottle cap, and any of the other features of the invention can be added, such as a pull tab, and/or a mating element for the pull tab. In one such embodiment, the pull tab is made of cork material extending directly from the cork, such that the pull tab is integral with the cork, to facilitate the removal of the cork from the bottle. The cork can be separable from the bottle and the pull tab can then be affixed to a protrusion on the bottle, to keep the cork with the bottle.

Figure 9:
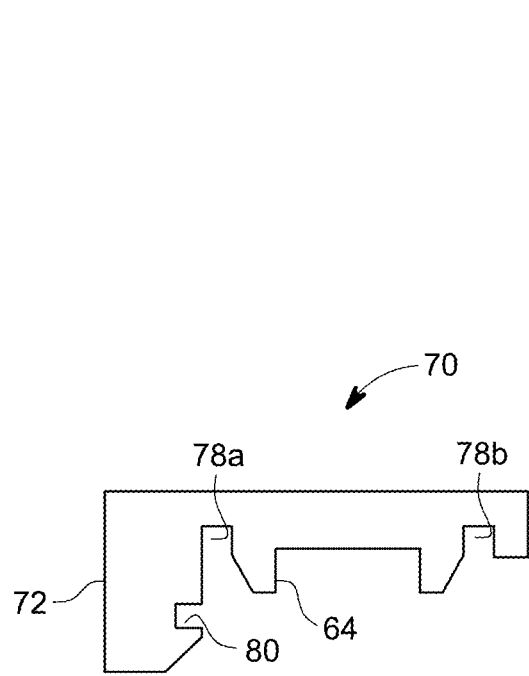
FIG. 9 is a cross-sectional view of a further embodiment of a container closure, with the container closure in a horizontal configuration.
Figure 10:
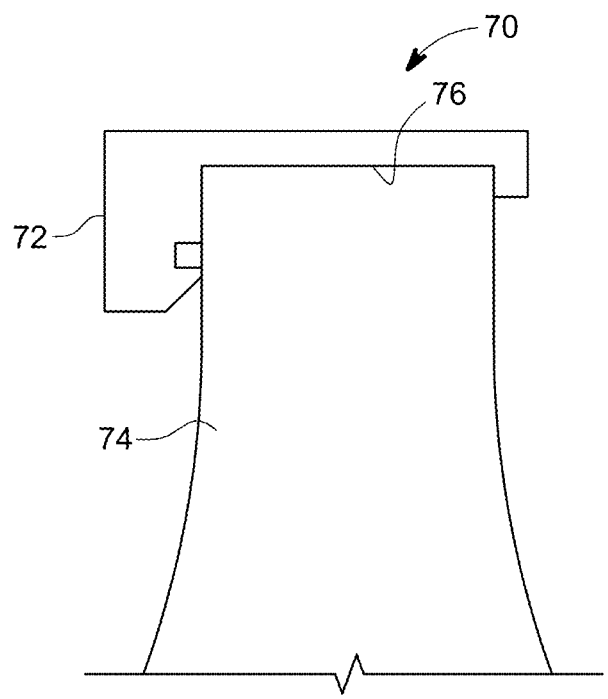
FIG. 10 is a cross-sectional view of the container closure of FIG. 9, with the container closure affixed onto the rim of a bottle to seal the bottle.

For example, preferred embodiments of various features of cork inventions are shown in FIGS. 9-12 (which, like the other figures, are not drawn to scale). These cork inventions can be used with wine bottles (although the embodiments are not limited to that use). FIG. 9 shows a cross-sectional view of an embodiment of a cork 70 (or other material), with the cork 70 in a horizontal configuration. FIG. 10 is a cross-sectional view of the cork 70 FIG. 9, with the cork 70 affixed onto the rim of a bottle to seal the bottle.

Cork 70 includes element 78, such that the cork fits onto bottle rim 76, with rim 76 fitting between sealing structure 64 and vertical pull tab 72.

In one embodiment, element 78a can be a space between tab 72 and sealing structure 64, to allow the bottle rim to fit between the pull tab and the structure 64. In this embodiment, the sealing is accomplished by the internal pressure of structure 64 against the inner circumference of the bottle neck.

Alternatively, a channel can circumscribe structure 64 such that 78a and 78b in FIG. 9 are both part of a single annual channel 78. In this embodiment, the bottle is sealed both by the channel 78 and the sealing structure 64. Namely, channel 78 circles and presses against the outside of the bottle rim, and structure 64 which circles and presses against the inside of the bottle.

FIG. 10 shows the embodiment with a channel (channel 78a-78b), such that the cork extends to the right in the figure, beyond the bottle rim. In the embodiment using sealing structure 64 with a space 78a, but without a channel 78a-b, the cork 70 fits snugly into the bottle rim, without the cork extending outward past the rim of the bottle (e.g., past the right side of FIG. 10), other than the pull tab portion of the cork. In other words, in the embodiment with a space 78a, the cork sits inside the bottle neck, with only the pull tab 72 extending outward past the bottle rim 76. In contrast, in the embodiment with a channel 78, the cork sits inside the bottle neck, and also extends outward past and over the bottle rim.

If desired, sealing structure 64 can have a hollowed-out portion and ring structure, as discussed regarding FIG. 8. The hollowed-out portion saves material, while the tapering and ring structure allows the cork to slide easily into and out of the bottle. More specifically, the hollowing-out provides the 2D "prongs" of the cork in FIGS. 8 and 9 (which "prongs" actually form a ring in three dimensions) with the improved ability to flex inward. This facilitates the insertion of the cork into the bottle rim, and the removal of the cork, again without the need for tools. Likewise, the tapering of the "prongs" (or more accurately ring) further facilitates the insertion and removal of the cork. Alternatively, in a less preferred embodiment, sealing structure can be cylindrical, or can be frustoconical (i.e., with a tapering), the cylindrical or frustoconical portions being provided without the hollowing-out of the cork material.

Cork 70 further preferably includes a tab or pull tab 72. With respect to FIG. 10, for example, a user grasps tab 72, and pulls it upwards and to the left, to pull the cork 70 away from bottle rim 76, to remove cork 70 from bottle neck 74. In this manner, the user can remove the cork from the bottle without needing to use a corkscrew or other tool.

Figure 11:
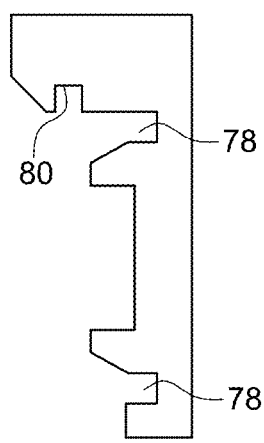
FIG. 11 is a cross-sectional view of the container closure of FIG. 9 in a vertical configuration.
Figure 12:
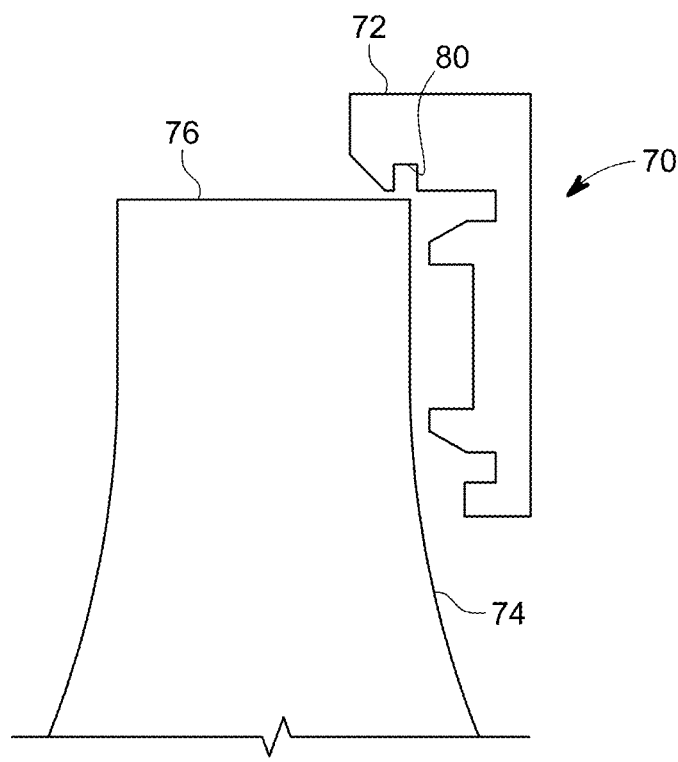
FIG. 12 is a cross-sectional view of the container closure of in the vertical configuration of FIG. 11, with the bottle open, and the container closure stored on the rim of the bottle.

Once the cork 70 has been removed from bottle neck 74, the user can rotate the cork 70 into the vertical configuration of FIG. 11. In this vertical configuration, the user can fit the cork 70 onto bottle rim 76 for storage purposes. As shown in FIG. 12, in the vertical configuration, cork 70 fits onto bottle neck 74 with rim 76 fitting into vertical channel 80. The cork can be stored on the rim 76 in this vertical configuration while the wine (or other liquid) is being poured; or while the wine bottle is resting on the table and the wine is "breathing"; so that cork 70 is always associated with the bottle and is not misplaced. Vertical channel 80 can also be curved as needed (depending on the size of the pull tab) so that channel 80 matches the curvature of the bottle rim.

Once the user wishes to seal the bottle, he or she can remove the cork 70 from bottle rim 76, by pulling the rim 76 out of channel 80. Then, to replace the cork onto the bottle, the user rotates the cork into the horizontal configuration, and inserts the cork 70 onto bottle rim 76 until the bottle rim 76 fits snugly into channel 78. The cork 70 can then seal the bottle until the user desires to open it again, at which time the user can pull on the tab 72 to again remove the cork 70 from the bottle. In this manner, the cork can be easily securely attached to, and easily detached from, the bottle as often as desired, without the need for additional tools.

Having described the inventions with respect to particular embodiments, it is to be understood that the description is not meant as a limitation, since numerous other modifications and variations may be made to the inventions or may suggest themselves. It is intended that the present inventions, and application, cover all such modifications and variations. Moreover, the information in each paragraph relates to and can be used in conjunction with the features of the inventions as disclosed in any and all other paragraphs herein.

I claim:

1. An article of manufacture, comprising:
   (a) a beverage bottle, said bottle comprising an inside, said bottle comprising a rim;
   (b) a bottle closure, said bottle closure comprising a cork;
   (c) said bottle closure comprising a sealing structure, said sealing structure comprising a ring;
   (d) said bottle closure comprising a horizontal configuration wherein said bottle closure is inserted into said bottle with said ring fitting snugly against said inside of said bottle, such that said bottle is sealed;
   (e) said bottle closure comprising a tab;
   (f) wherein a user can pull said tab such that said bottle closure slides out of said bottle to unseal said bottle;

(g) wherein said bottle closure comprises a vertical configuration, and wherein said bottle closure comprises a channel in said cork in said vertical configuration such that said rim fits into said channel to store said bottle closure on said bottle while said bottle is open; and,
(h) wherein a user can slide said rim out of said channel, and can refit said bottle closure into said rim of said bottle such that said ring fits snugly against said inside of said bottle to reseal said bottle.

2. An article of manufacture as claimed in claim 1, wherein said ring has a tapered surface.

3. An article of manufacture as claimed in claim 1, wherein said cork further comprises a second channel, and wherein said second channel fits snugly against the outside of said rim of said bottle to further seal said bottle when said ring fits snugly against the inside of said bottle.

4. An article of manufacture as claimed in claim 1, wherein said bottle is a wine bottle.

5. An article of manufacture as claimed in claim 2, wherein said bottle is a wine bottle.

6. An article of manufacture as claimed in claim 3, wherein said bottle is a wine bottle.

7. An article of manufacture, comprising:
(a) a beverage bottle, said bottle comprising an inside, said bottle comprising a rim;
(b) a bottle cork;
(c) said cork comprising a ring;
(d) said cork comprising an annular channel;
(e) said cork comprising a horizontal configuration wherein said cork is inserted into said bottle with said ring fitting snugly against said inside of said bottle, and said rim fitting snugly into said annular channel, such that said bottle is sealed;
(f) said cork comprising a tab;
(g) wherein a user can pull said tab such that said cork slides out of said bottle to unseal said bottle;
(h) wherein said bottle cork comprises a vertical configuration, and wherein said cork comprises a vertical channel in said vertical configuration such that said rim fits into said vertical channel to store said cork on said bottle while said bottle is open; and,
(i) wherein a user can slide said rim out of said vertical channel, and can refit said cork into said rim of said bottle such that said ring fits snugly against said inside of said bottle, and said rim fits snugly within said annular channel, to reseal said bottle.

8. An article of manufacture as claimed in claim 7, wherein said ring has a tapered surface.

9. An article of manufacture as claimed in claim 7, wherein said bottle is a wine bottle.

10. An article of manufacture as claimed in claim 8, wherein said bottle is a wine bottle.

* * * * *